United States Patent Office 3,514,756
Patented May 26, 1970

3,514,756
INTERMITTENT VEHICLE FUNCTION CONTROL SYSTEM
Louis Duteil, Livry-Gargan, France, assignor to Compagnie des Freins et Signaux Westinghouse, Paris, France
Filed Mar. 17, 1967, Ser. No. 623,980
Claims priority, application France, Mar. 22, 1966, 54,578
Int. Cl. H04q 1/45
U.S. Cl. 340—171
9 Claims

ABSTRACT OF THE DISCLOSURE

An intermittent vehicle function control system in which provision is made to alternately detect signals established by parallel signal generating units positioned along the vehicle's way. This is accomplished by the utilization of tuned amplifiers, the total number of which equals the number of frequencies utilized in the system which in turn will allow a number of code command outputs to control vehicle function, which number is a square of the total number of frequencies employed. A signal selecting circuit alternately detects signals from the signal generating units and passes these detected signal to a tuned amplifier array which in turn passes the detected signals to a signal processing logic circuit which then passes the processed signals to a decoding matrix. The output from the decoding matrix is used to control the vehicle's functions as well to reset the system to receive the next appearing signals from the signal generating units positioned in the way.

Figure 1:
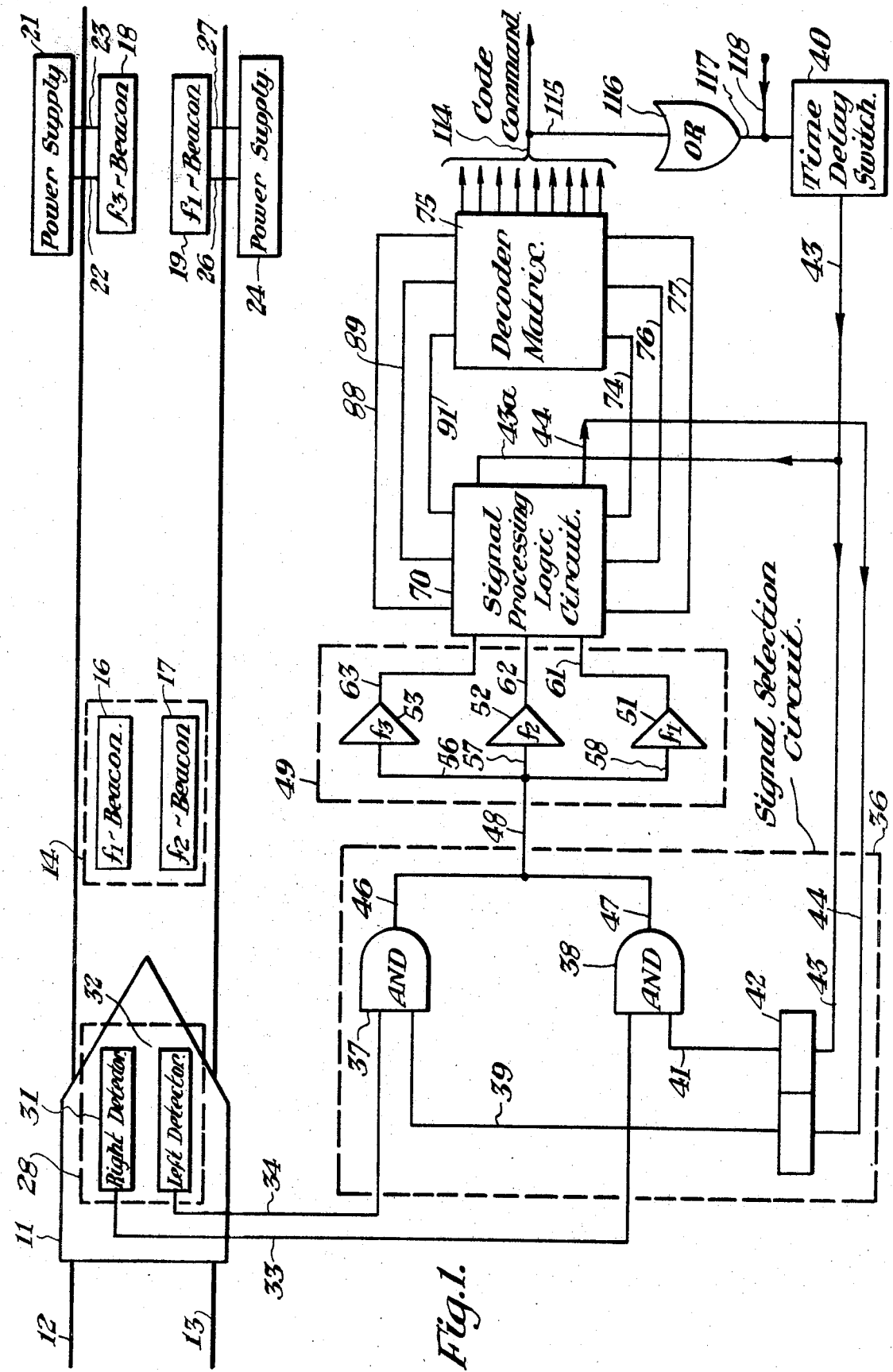

This invention relates to an intermittent vehicle function control system.

More specifically, this invention relates to an intermittent vehicle function control system wherein a pair of parallel vehicle-carried signal detectors respond simultaneously to the presence of a parallel pair of signal establishing units positioned along a way over which the vehicle travels. The system includes a signal selecting circuit which is electrically connected to the parallel pair of detectors in such a manner that signals detected by the signal detectors are alternately selected and delivered to a tuned amplifier array, which amplifier array has a plurality of parallel tuned amplifiers equal in number to the number of different signals employed in the system. A signal processing logic circuit is electrically connected to the amplifier array to thereby receive the alternately selected signals and deliver the signals to a decoding matrix, which matrix has a code command output signal to control the vehicle's function whenever signals have been detected by both of the parallel detectors and have been processed by the signal processing logic circuit. The appearance of the code command output signal simultaneously conditions both the signal processing logic circuit and the signal selecting circuit to receive one of the alternately selected signals from the pair of detectors. The signal processing logic circuit has an output which is fed to the signal selecting means to select the other signal from the alternately selected signals whenever the first signal selected signals whenever the first signal selected has been processed by the signal processing logic circuit.

The swelling need to provide more information to control the operation of trains has risen at an enormous rate due to the trend toward high speed rapid transit where speeds in excess of one hundred miles an hour will be the rule rather than the exception. Accordingly, the existing techniques of getting increased train command information to the train has produced the logical addition of more and more equipment on the train to a point where the cost and volume of such equipment is prohibitive. Furthermore, the increased speed of the trains and the related problem of the rapid processing of this information on the train has outstripped the speed at which conventional relays and circuits can respond.

Train-carried systems of the prior art that utilized the presence of multiple frequency signals delivered from the wayside basically required tuned amplifiers equal in number to the total number of different frequency signals employed in the system. While some dual use of the tuned amplifiers could be achieved by staggering the positions of the command frequency sources along the wayside, this inevitably reduced the overall code capacity with reference to the real time elapsed to perform a given number of functions. This problem has been solved in part by placing the command frequency sources parallel with the rails, but this then required a separated bank of tuned amplifiers on the train for each signal source simultaneously passed. The invention to be described virtually obviates the problem of high speed processing of commanding signals on the train and does so with only half the number of tuned amplifiers as required above. All of this has been accomplished with utmost simplicity, thereby greatly advancing the state of the art.

It is therefore an object of this invention to provide a plurality of vehicle control code command outputs equal to the square of the number of different signals employed in the system by utilizing only as many tuned amplifiers as there are different signals employed.

Another object of this invention is to provide reliable high speed coded information through the use of compact, rugged, lightweight solid state devices.

In the attainment of the foregoing objects the system includes a vehicle-carried detector which responds to the presence of signal generating units positioned at distinct locations along the vehicle's way. Each signal generating unit has the capacity to establish at least a first and a second signal. The vehicle-carried detector has at least a first and a second detector which responds to the first and second signal respectively. A signal selecting circuit is electrically coupled to the first and second detector to alternately select the first signal or the second signal. A tuned amplifier array is electrically coupled to the signal selecting circuit and includes a plurality of electrically parallel, separate tuned ampifiers equal in number to the number of different signals employed in the system. A signal processing logic circuit is electrically coupled to the tuned amplifier array to receive the alternately selected first and second signals and deliver these outputs to a decoding matrix. The decoding matrix has a code command output to control the vehicle's function whenever the first and second signals have been processed by the signal processing logic circuit. The appearance of the code command output simultaneously is utilized to condition the signal selecting circuit and the signal processing logic circuit to receive the first signal. Finally, the signal processing logic circuit has an output to the signal selecting circuit to condition the signal selecting circuit to select the second signal whenever the first signal has been processed by the signal processing logic circuit.

Other objects and advantages of the present invention will become apparent from the ensuing description of illustrative embodiments thereof, in the course of which reference is had to the accompanying drawings in which:

FIG. 1 illustrates in block diagram form an embodiment of the intermittent vehicle function control system of the invention.

Figure 2:
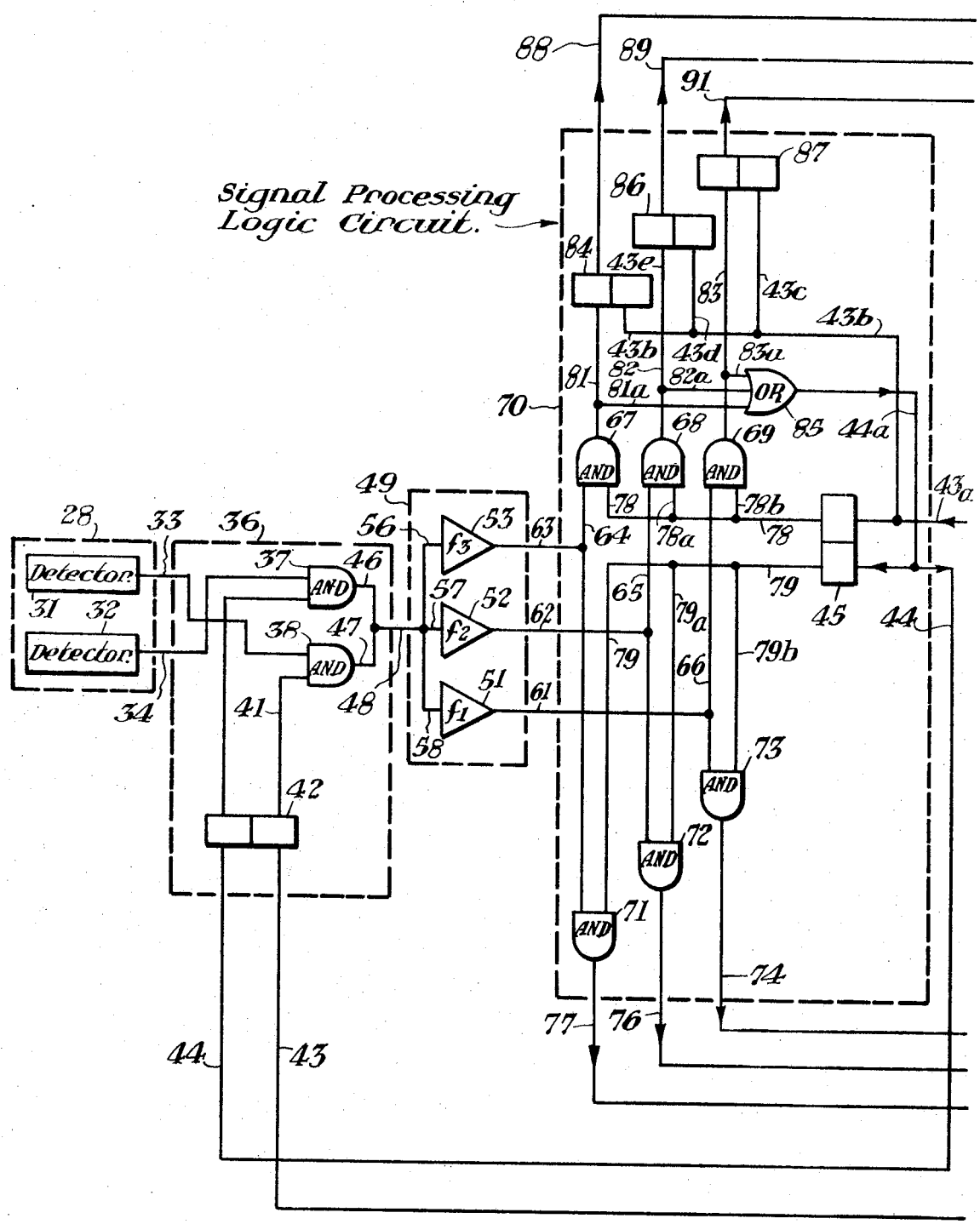
Figure 3:
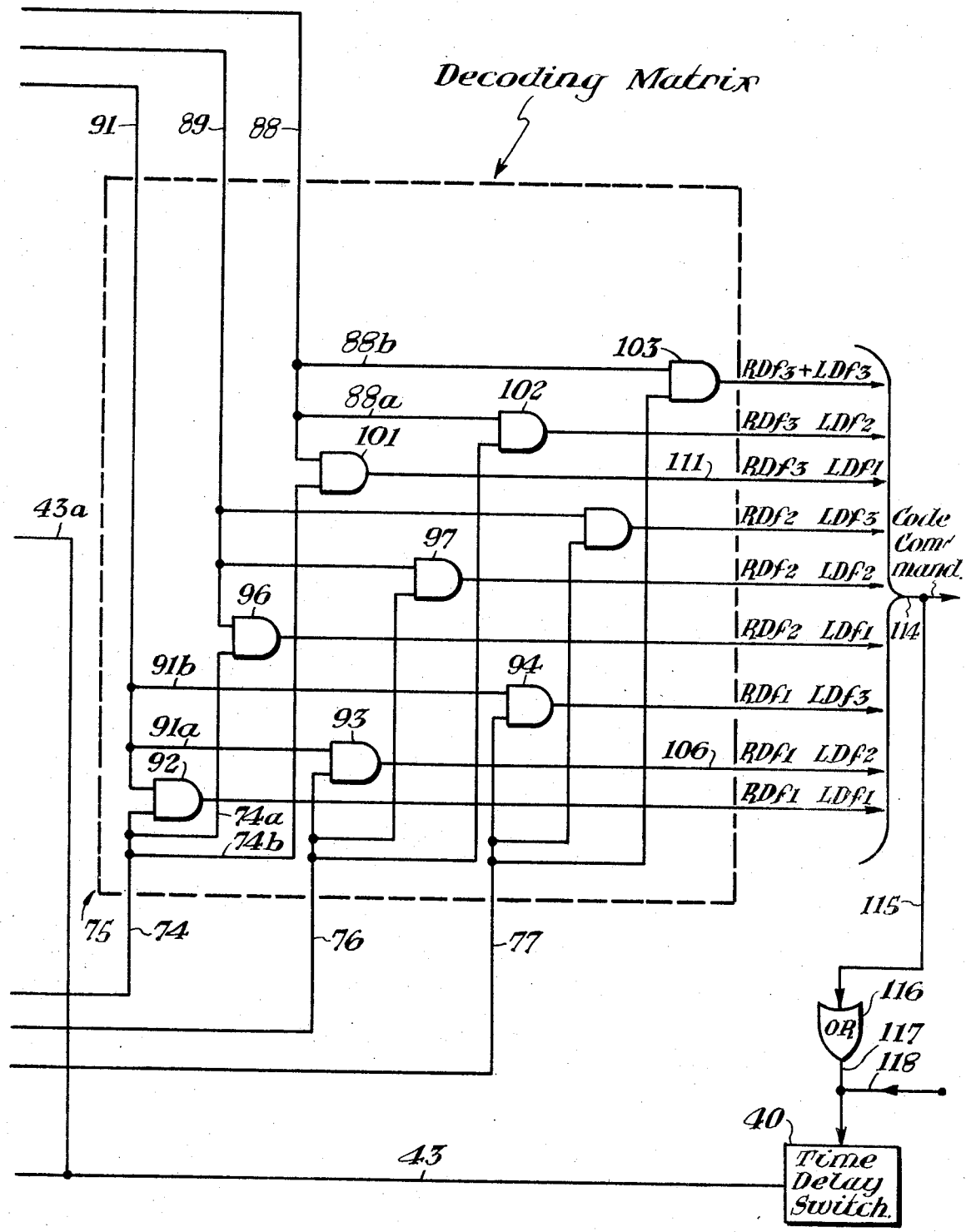

FIGS. 2 and 3, taken together with FIG. 3 to the right of FIG. 2, are a circuit diagram of the system set forth in FIG. 1.

A description of the above embodiment will follow and then the novel features of the invention will be presented in the appended claims.

Reference is now made to FIG. 1, in which there is depicted a block diagram which includes the system concept of this invention. Depicted at the upper left-hand corner of FIG. 1 is a vehicle 11; in this instance it will be described as a train. It should be readily understood that while the vehicle 11, for purposes of description, is recited as a train, this system would be equally applicable to any environment in which a vehicle moved along a predetermined way. In this instance the train 11 travels upon rails 12 and 13, moving from left to right in this figure. As the train moves from left to right along the rails 12 and 13, it passes over a series of distinct locations, each location containing a pair of beacons or signal producing units, the first of which encountered in this figure is signal generating means 14 which has signal establishing beacons 16 and 17. These beacons, as they are termed, may be of the conventional type in which there is a circuit which oscillates in the presence of a detector which passes over it to produce a particular frequency. It will be noted also that further down the track to the right there is another pair of beacons 18 and 19 which could deliver separate frequency signals and which would receive power from a power supply 21 over leads 22 and 23 to beacon 18. This beacon 18 has been designated as having an $f3$ frequency, while beacon 19 immediately beneath has a frequency $f1$. This beacon 19 receives its power from the power supply 24 over the leads 26 and 27.

There may be either a passive type beacon, as depicted in signal generating means 14 where there is an $f1$ frequency generated due to the coaction of coils positioned in the way with the detectors 31 and 32 carried by the vehicle 11, or there may be a signal generator of the type depicted next along the rail. The signal generating means 14 has both an $f1$ frequency capability as well as $f2$ frequency capability. The function of these frequencies will be understood more fully as the description ensues.

The train 11 carries thereon a detector means 28. This detector means carries a pair of parallel detectors 31 and 32. Detector 31 is termed the right detector while detector 32 is termed the left detector. As the vehicle passes from left to right in this figure, the detectors 31 and 32 will pass simultaneously over beacons 16 and 17 and then over beacons 18 and 19. In each instance the detectors 31 and 32 will simultaneously receive their frequencies being established by the beacons 16 and 17 and then the beacons 18 and 19. It will, of course, be appreciated that in the one instance where the circuitry of beacons 16 and 17 is of a passive nature, then the corresponding circuitry within the right detector 31 or left detector 32 will have to be of a type that inductively cooperates with the circuitry of the signals generating means 14 to produce a frequency $f1$, $f2$ in the right and left detectors 31 and 32, respectively. When the vehicle passes over a beacon of the type of beacons 18 and 19, the detectors need only then be elementary coils which receive inductively the $f3$ and $f1$ signals from the beacons 18 and 19.

Each of these locations which contain the parallel sets of beacons is to be utilized in a well-known manner; that is to say, the preesnce of the beacons, for example, signal generator 14 with its beacons 16 and 17, may produce a combination of frequencies which, when received by the train-carried equipment, will produce a particular command. For example, when approaching a staiton this command may be to slow the vehicle in a predetermined manner so that the approach speed of the vehicle to the station is appropriate. Many combinations of frequencies are needed in the increasingly complex systems contemplated for use today and in the future. Accordingly, there may be as many as one hundred command functions that need to be performed by the train as it travels along the way.

In order to have one hundred command functions available, this system would require ten discrete frequency level singals, which will be termed hereafter as $n$ signals for the system, and as the system description ensues it will be seen that wherever there are $n$ umber of signals present in the system, the total system capacity for command signals to produce train functions will be the square of the number of frequencies utilized. Therefore, if ten frequencies were utilized there would be one hundred command functions available.

In the description hereafter, an elementary form of the invention is set forth in which but three discrete frequencies are utilized, hereinafter referred to as frequencies $f1$, $f2$ and $f3$. This, of course, would produce nine code command outputs to be utilized by the system.

Positioned beneath the vehicle and the rails depicted at the top of the figure is the vehicle-carried equipment set forth in block diagram form. There will be seen a number of basic components electrically coupled one to another. The first unit to be described is that of the signal selection circuit 36 from which emanate electrical leads 33 and 34 which terminate respectively at right detector 31 and left detector 32. Each of the electrical leads 33 and 34, which emanate from the signal selection circuit 36, has its origin at AND gates 37 and 38. At this moment it will be appreciated that the appearance of a signal detected on either right detector 31 or left detector 32, as a result of the detectors passing over the beacons 16 and 17, will produce simultaneously in the right detector 31 and the left detector 32, respectively, the signals $f1$ and $f2$ which will in turn be delivered at the same instant over the leads 33 and 34 to gates 38 and 37. The passage of these signals, of course, will depend upon whether there is an enabling signal present at the AND gates 37 and 38 being delivered over the leads 39 and 41 which emanate from a memory device 42, which in practice may be a flip-flop.

Under normal operating conditions of this system the flip-flop or memory device 42 will be assumed hereafter to be in its initial state or condition when there is a signal present on lead 41 which emanates from the flip-flop 42 and is therefore present at the AND gate 38. It will accordingly be seen that as soon as a signal is detected in right detector 31, this signal in the first instance when the vehicle passes over the signal generator 14, will be an $f1$ frequency which will be delivered to the AND gate 38, and since there is present a signal on lead 41, this $f1$ frequency will be passed by the AND gate over electrical leads 47 and 48 to the next major component of the system herein referred to as a tuned amplifier array 49 shown in dotted outline. But before going further, it should be noted that in order that the memory device 42 has an output present on lead 41 there must initially be a signal delivered to the memory device over the electrical lead 43, which enters from the right-hand side of signal selection circuit 36, and which has been delivered by the time delay switch 40, the function of which will be described more fully hereafter.

In order that the second AND gate 37, which is electrically connected via lead 34 to the left detector 32, pass the frequency $f2$ first detected as the vehicle passes over the signal generator 14, there will have to be present a signal on electrical lead 39 which emanates from the flip-flop 42. This flip-flop or memory device 42, operating in a conventional manner, will always have the outputs as represented by the leads 41 and 39 in different states dependent upon the energization of the electrical leads 43 and 44 which enter the separate portions of the flip-flop 42. As noted earlier, when a signal appears on lead 43 the flip-flop 42 conditions the electrical lead 41 to be "on," and when a signal appears on electrical lead 44, the electrical lead 39 will then be in an "on" condition or have a signal present, and the signal that had appeared on electrical lead 41 from the flip-flop 42 will disappear, therefore rendering the AND gate 38 incapable of passing a signal present on the electrical lead 33. When the electrical lead 39 is energized, the appearance of a signal detected by the left detector 32 will pass over the electrical lead 34 to the AND gate 37 where there will simultaneously appear signals on both leads 39 and 34, permitting the passage of the $f2$ frequency signal over the electrical leads 46 and 48 to the tuned amplifier array 49.

From what has been described it will be seen that there may be delivered to the tuned amplifier array 49 signals which represent the signals detected by either right detector 31 or left detector 32. In the first instance described they would be respectively an $f1$ frequency for the right detector 31 and an $f2$ frequency for the left detector 32. It should also be noted, of course, that the selection of the $f1$ frequency and the $f2$ frequency is entirely arbitrary and is done only for purposes of explaining the system operation which will now proceed.

Accordingly, as it has been noted, there will appear on the electrical lead 48, which emanates from the signal selection circuit 36, either an $f1$ frequency or an $f2$ frequency. In the event that an $f1$ frequency has appeared due to the fact that AND gate 38 has been enabled and the right detector 31 is passing over the beacon 16, this $f1$ frequency would be passed and would therefore be fed simultaneously to a group of parallel tuned amplifiers 51, 52 and 53, which are tuned respectively to pass only and amplify only the frequencies $f1$, $f2$, $f3$, respectively. Each of these amplifiers 51, 52 and 53 is electrically connected to the electrical lead 48 via the leads 58, 57 and 56, respectively. Each of the tuned amplifiers 51, 52 and 53 in turn has outputs 61, 62 and 63, respectively, emanating from these tuned amplifiers and delivered from the tuned amplifier array 49 to a signal processing and logic circuit 70. The function of this signal processing and logic circuit will be described more fully hereafter and the precise circuitry will be made evident from a study of FIG. 2 which will follow.

The primary function of the signal processing and logic circuit 70 is to first receive the signal detected by the right detector 31. Note here that the selection of a signal from right detector 31 is arbitrary in the sense that either the right detector 31 or left detector 32 may be selected as the first detector to be allowed to pass a signal to be processed by the system. This description will ensue hereafter predicated upon the basic premise that in all operations the right detector 31 will pass its frequency initially and then in a moment shortly thereafter the left detector 32 will be permitted to pass its signal to be processed by the system.

Under the conditions here described, when right detector 31 has passed a signal through the AND gate 38 and into the amplifier array 49 where the signal is an $f1$ frequency, this frequency will be passed by the tuned amplifier 51 to the signal processing and logic circuit 70, which in turn will deliver this $f1$ frequency over the electrical lead 91 to a decoder matrix 75 where the presence of the $f1$ frequency in the decoder matrix 75, which will be described more fully hereafter, will be retained for purposes of decoding the combination of signals to be received ultimately by the decoder matrix 75. The next signal which will appear would arrive an instant later while the detectors 31 and 32 are passing over the beacons 16 and 17. This signal would be the $f2$ frequency signal which would be established by the beacon 17 and passed by the AND gate 37 through the amplifier array 49 and specifically the tuned amplifier 52 to the signal processing and logic circuit 70. There the $f2$ frequency from the left detector 32 would be caused to pass from the signal processing and logic circuit over the electrical lead 76 to the decoder matrix 75. The appearance of the $f1$ frequency over the lead 91 to the decoder matrix 75 coupled with the presence of the $f2$ frequency signal from beacon 17 would produce an output on one of the many outputs shown emanating from the right of the decoder matrix 75. The outputs from the decoder matrix 75 have not been numbered in this figure but all of the outputs have been represented by a single output which is delivered over schematically depicted electrical lead 114, which is herein termed a code command output. The appearance of any coded signal to the decoder matrix 75 will, as schematically shown here, produce an output simultaneously on the schematically shown electrical lead 115 which is delivered to an OR gate 116. Therefore, whenever any signal from the decoder matrix 75 is present, the apparance of this signal will cause the OR gate 116 to pass a signal over electrical lead 117 to a time delay switch 40. At this time it should be pointed out that the electrical lead 118 which appears directly beneath the OR gate 116 contains what is termed a constant frequency signal, which signal is derived from another portion of the system. This signal's function is to maintain a constant quiescent condition present in the system whenever the vehicle, in this case train 11, is not passing over a location where a signal generating means, such as 14, is present. In other words, there is always a signal present on electrical lead 118 until the vehicle passes over the pair of beacons such as that present in signal generator 14. When this occurs, the constant frequency signal is removed and the system is allowed to operate in the mode to be described more fully hereafter.

It is important, of course, that this system always operate in a predetermined fashion. As has been noted earlier, this predetermined mode of operation has been arbitrarily selected such that the right detector 31 will pass a signal received just before the left detector 32 passes the signal simultaneously being received by this detector. In order that this be accomplished it is apparent that the flip-flop or memory device 42 must be in a state such that there is an output present on electrical lead 41, which emanates from the flip-flop 42. This will occur in the following situation. Whenever a code has been processed in which both a signal from the right detector 31 and the left detector 32 have been passed through the system, there will appear a code command output on electrical lead 114 which will in turn pass through the OR gate 116 over the electrical lead 115, thence over lead 117 to the time delay switch 40, which time delay switch is of a conventional nature and only delays the signals for sufficient time for the vehicle to pass over the location involved, this time delay switch producing a signal on electrical lead 43 which is designed to condition the system to be receptive to the signals present at the next location to be passed over. Accordingly, a moment after the code command is to be processed, or if a code command has been received when the system is turned "on" to operate, the presence of the constant frequency signal over the lead 118 will cause a signal to appear on lead 43 which conditions the flip-flop 42 to have an output over electrical lead 41. Simultaneously with the conditioning of the flip-flop 42 there is delivered to the signal processing and logic circuit 70 over electrical lead 43a a signal which conditions the signal processing and logic circuit to be receptive to the signal delivered from the right detector 31 so that the signal processing and logic circuit will initially pass the signal to the decoder matrix 75 over any one of the electrical leads 88, 89 and 91. Once this right retector signal has been processed by the signal processing logic 70 the passage of any single frequency signal to the signal processing and logic circuit will produce an output on electrical lead 44 which emanates to the right of the signal processing and logic circuit 70. This signal which appears on electrical lead 44 will be delivered to the signal selection circuit 36 at the flip-flop 42 to thereby render the electrical lead 39 conductive and the electrical lead 41 of course will be rendered nonconductive. The appearance of a signal on electrical lead 39 will enable the gate 37 to receive the signal from the left detector 32, and the system will continue to function in the manner that has been described.

The next description will go to a circuit arrangements of FIG. 2 and FIG. 3 which will show in what manner this invention may be carried out. But before the next figures which depict the detailed circuitry are described, certain basic aspects of the system should be recognized as essential to the operation of the system. One, that dependent upon the number of frequencies used in the system, in this instance three, there will be required as many tuned amplifiers in the amplifier array 49 as there are frequencies in the system. Note also that the detectors 31 and 32 of the signal detecting means 28 will pass simultaneously over the signal generating means 14 with their respective beacons 16 and 17. At this point it should be appreciated that a vehicle, such as a train, traveling at the speed of one hundred miles per hour plus will be over the beacons 16 and 17 but a few milliseconds. Herein lies one of the important aspects of this system and that is the presence of the signal detector 28 over the signal generating means 14 lasts but a few milliseconds and in these few milliseconds both frequencies delivered by the beacons 16 and 17 must be processed completely and delivered as a code command output. It is this speed requirement that places the absolute requirement that the system be of a solid state nature and the ensuing description of FIGS. 2 and 3 will set forth a typical solid state network which is capable of processing signals in these few milliseconds to provide a useable code command output of the type described earlier.

Reference is now made to FIGS. 2 and 3 which taken together form the entire system which is depicted in block diagram form in FIG. 1. The description that follows will be illustrative of a typical situation where the vehicle 11, here the train, moves along the rails 12 and 13, as shown in FIG. 1, passing first the signal generating means 14 with its beacons 16 and 17, and then passes down the rails past beacons 18 and 19 at the next location depicted in FIG. 1. Accordingly, the right detector 31 will receive the $f1$ sginal first from the beacon 16 of the signal generator 14 and the left detector 32 will receive the $f2$ frequency signal from the beacon 17. These signals will be processed by the system and will appear as a code command output as noted earlier. The vehicle will then pass along the rails and the right detector 31 will detect the $f3$ frequency from the beacon 18 and the left detector 32 will then detect the $f1$ frequency signal from beacon 19.

As has been pointed out with reference to FIG. 1, when the system is in the quiescent state there is present on lead 43, which emanates from time delay switch 40, a pulse or signal which is delivered to the signal selection circuit 36, and particularly to the flip-flop or memory device 42 in the signal selection circuit 36. This will produce an output on electrical lead 41 from the flip-flop 42 and therefore condition the gate 38 to be responsive to a signal detected by the right detector 31 of the detecting means 28. In addition, the signal that appears on electrical lead 43 will also be delivered via the electrical lead 43a to the signal processing and logic circuit 70. This signal processing and logic circuit 70 has been referred to earlier and will now be described in detail from the standpoint of the general operation of the signal processing circuit.

When a signal has been delivered from the time delay switch 40 over the leads 43 and 43a, this signal will arrive at flip-flop 45 and condition the upper portion thereof to produce a signal on electrical lead 78 which emanates from the flip-flop 45 and passes to the left and simultaneously conditions AND gates 67, 68 and 69 via electrical leads 78, 78a and 78b, respectively. These gates, when enabled in this fashion, will permit the passage of signals which have been detected by the right signal detector 31 of the detecting means 28. Now, it will be presumed that the right detector 31 has just entered and is passing over the $f1$ beacon 16 of the signal generating means 14, as shown in FIG. 1. When this occurs, an $f1$ frequency signal will be delivered from the right detector 31 over the electrical lead 33 to the AND gate 38 where, as has been noted, the presence of a signal on lead 41 will permit the passage of the $f1$ frequency signal over the electrical leads 47 and 48 to the amplifier array 49, and thence along electrical lead 58 to and through tuned amplifier 51, electrical lead 61, to electrical lead 66. Electrical lead 66 is connected to the AND gate 69 just noted and it will be appreciated that there is now present at the AND gate 69 a pair of signals present on both leads 66 and 78b which will permit the passage of the $f1$ frequency to electrical lead 83, which in turn will condition a flip-flop 87 to its "on" condition and there will appear on lead 91 of the flip-flop 87 a signal which will be delivered to the decoder matrix 75 and will be utilized in a manner to be described hereafter.

Returning now to the signal processing and logic circuit 70, when the flip-flop 45 has been conditioned by the presence of a signal on electrical lead 43a, one half of the flip-flop 45, which has electrical lead 79 emanating therefrom, will have no signal thereon due to the fact that this side of the flip-flop is "off." It will be seen that with this side of the flip-flop 45 "off," there is no signal on electrical lead 79 and in a similar fashion there will be no signal present on leads 79, 79a and 79b, all of which terminate respectively at AND gates 71, 72 and 73. It will, therefore, be seen that the appearance of a signal delivered by tuned amplifier 51, which appears on electrical lead 66, can only pass through AND gate 69 since the other AND gate 73 has not been conditioned by the presence of a signal on electrical lead 79b.

Continuing with the signal processing which occurs in the logic circuit 70, it was just stated that the $f1$ frequency signal will appear on the electrical lead 83 emanating from the AND gate 69. Extending to the right and in electrical connection with the electrical lead 83 is lead 83a to an OR gate 85. As soon as a signal appears on lead 83a the OR gate 85 will pass this signal over electrical lead 44a to electrical lead 44 which will provide two simultaneous functions. The appearance of a signal on electrical lead 44 from the OR gate 85 will turn the lower half of the flip-flop 45 "on" and the upper half of the flip-flop 45 "off," thereby placing a signal on the electrical lead 79 emanating to the left of the flip-flop 45. Simultaneously, with the appearance of a signal on the lead 79 a signal will appear on leads 79a and 79b to condition simultaneously the AND gates 71, 72 and 73 to be receptive to the next succeeding signal that is passed by the amplifier array 49, in a manner to be described hereafter. In addition, the appearance of a signal on the lead 44a will also electrically establish the condition of flip-flop 42 wherein the left-hand portion of the flip-flop 42 will be "on" and the right-hand portion will be "off." With the left-hand portion of the flip-flop 42 "on," a signal will then appear on the electrical lead 39 and condition the gate 37 to be receptive to a signal that will be detected by the left detector 32.

It should be appreciated that this transmission of a signal and processing of it has taken but a few milliseconds. Now with a signal detected by the left detector 32, in this case it is the $f2$ frequency of beacon 17 which detecting means 28 is over, this signal $f2$ will be passed along the electrical lead 34 to the AND gate 37 and an electrical signal of the $f2$ frequency will appear on lead 46 from the AND gate 37. This $f2$ frequency will pass over the leads 46 and 48 to the amplifier array 49 and the $f2$ amplifier 52 will pass this frequency via the electrical lead 62 to electrical lead 65 in the signal processing and logic circuit. The appearance of the $f2$ frequency on the electrical lead 65 in conjunction with the signal present on the electrical lead 79a will permit the AND gate 72 to pass the $f2$ frequency over the electrical lead 76 to the decoding matrix 75.

Now a study of the decoder matrix will ensue in which will be observed the manner in which the presence of an $f1$ frequency present on electrical lead 91 and the presence of an $f2$ frequency on lead 76 will produce an output from the decoder matrix. With the $f1$ frequency on lead 91 there will appear simultaneously on leads 91$a$ and 91$b$, which are connected in common to the lead 91, the $f1$ frequency. This $f1$ frequency will therefore be present at AND gates 92, 93 and 94. Of particular interest to this study is the AND gate 93. It will be seen that the appearance of the $f2$ frequency on the lead 76 of the signal processing and logic circuit will be simultaneous with the $f1$ signal which was present on electrical lead 91$a$. The appearance of both of these signals will produce a final output signal which is a combination of the $f1$ and $f2$ frequencies which will appear on electrical lead 106, which emanates from the right of decoder matrix 75, and has been designated as right detector frequency $f1$ and left detector frequency $f2$, all of which will pass over electrical lead 114 as a code command to perform the desired function of the train.

The appearance of the signals $f1$ and $f2$ from the right and left detectors, respectively, will also establish in the electric lead 115 from the lead 114 a signal which will be pased by the OR gate 116 to the time delay switch 40 which will then, after a momentary delay, pass the signal along electrical lead 43 to provide the dual function of resetting the flip-flop 42 to cause AND gate 38 to be receptive of a signal detected by the right detector 31, as well as conditioning the upper portion of flip-flop 45 to condition the gates 67, 68 and 69 to be receptive to a next detected signal by the right detector 31.

As the train now proceeds along the rails, as shown in FIG. 1, the right detector 31 will encounter the $f3$ frequency of beacon 18 and the $f3$ frequency will pass along electrical lead 33 to AND gate 38 which has been conditioned by a signal present on lead 41 of flip-flop 42. This $f3$ frequency will travel along electrical leads 47, 48 and 56 to the $f3$ tuned amplifier 53 which will present an $f3$ frequency on the electrical lead 63, which in turn will be delivered over electrical lead 64, to the AND gate 67. The $f3$ frequency signal delivered by the AND gate 67 will be passed over electrical lead 81 to flip-flop 84 which will thereupon turn this flip-flop 84 "on" and present an $f3$ frequency signal on electrical lead 88 which will be delivered to the decoder matrix 75. It should be appreciated at this moment that the flip-flops 84, 86 and 87 each have been reset to their "off" condition by the appearance of the reset pulse that appeared on electrical leads 43 and 43$a$, which in turn had reset flip-flop 45, as well as each of the flip-flops 84, 86 and 87.

The next signal that the detector 32 is receiving is the $f1$ frequency which will be passed over the electrical lead 34 to the AND gate 37. As has been noted earlier, the appearance of the signal on the electriacl lead 81 to the AND gate 67 of the signal processing and logical circuit 70 has simultaneously conditioned flip-flops 45 and 42 over the electrical circuit which includes lead 81$a$ through the OR gate 85 and electrical lead 44$a$, to condition the flip-flop 45 in its lower half to an "on" state to thereby render the gates 71, 72 and 73 conditioned to receive the subsequent signals, namely, the $f1$ signal detected from the $f1$ beacon 19 of the second location. The appearance of the $f1$ frequency, from left detector 32 through AND gate 37 and the tuned amplifier 51, at the AND gate 73, coupled with the presence of a signal on lead 79$b$ to the AND gate 73, will allow the passage of the $f1$ signal through AND gate 73 and over the lead 74 to the decoding matrix 75. Now the decoding matrix has been presented with two signals, one an $f3$ signal delivered over the electrical lead 88, and the other an $f1$ signal delivered over the electrical lead 74. The presence of the $f3$ signal on the lead 88 will simultaneously condition AND gates 101, 102 and 103 over electrical lead 88, 88$a$ and 88$b$, respectively.

The appearance of the $f1$ frequency signal on lead 74 will simultaneously present to gates 92, 96 and 101 a signal representative of the $f1$ frequency detected by the left detector 32. It will therefore be appreciated that the AND gate 101 of the decoder matrix 75 has present both the $f3$ frequency present on lead 88, as well as the $f1$ frequency present on lead 74$b$. The appearance of these two signals will provide an ultimate output signal on elctrical lead 111 which will be a combination of the $f3$ frequency from the right detector and the $f1$ frequency from the left detector, which in turn will be delivered over electrical lead 114 and the appearance of this signal on lead 114 will create a signal on lead 115 which will be passed by the OR gate 116 and the lead 117 to the time delay switch 40 to repeat the cycle.

From the symmetry of the system just described it will be appreciated that the decoding matrix has the capability of producing a discrete series of outputs which are a function of the number of frequencies employed in the system. The total number of the code command outputs is a square of the number of frequencies utilized in the system. Accordingly, there is shown emanating from the right-hand side of the decoding matrix 75 all the possible combinations of command signals available when three frequencies are employed. Reading these code commands from bottom to top there are three possible combinations when the right detector has been designated frequency RD$f1$, and the left detector has been designated LD$f1$, LD$f2$ or LD$f3$. The same will be true when the right detector is either RD$f2$ or RD$f3$ as is shown immediately above. As has been set forth at the outset of this application there are employed in the amplifier array 49 only as many tuned amplifiers as there are frequencies employed in the system. This system accordingly may be expanded to any number of frequencies desired without departing from the spirit of the invention. The logic circuitry depicted in both the signal processing and logic circuit 70 and the decoding matrix 75 forms no specific part of this invention and therefore this logic circuitry may be of the type depicted or any similar type capable of processing the signals in the manner set forth in the objects of this invention. The decoding matrix 75 is typical of the decoding matrixes employed in binary code systems and therefore in and of itself has been included only to enhance the understanding of the invention, but it is not intended to form a limiting portion of this invention as any decoding matrix that can handle a binary code may be readily employed.

Having thus described my invention, what I claim is:

1. An intermittent vehicle function control system wherein a pair of parallel vehicle-carried detector means responds simultaneously to the presence of a parallel pair of signal establishing units positioned along a way over which said vehicle travels,
  (a) signal selecting means electrically coupled to said parallel pair of detectors to alternately select signals from said parallel pair of detectors and deliver said selected signals to an amplifier means which amplifier means has a plurality of separate tuned amplifiers equal in number to the number of different signals employed in said system,
  (b) signal processing means electrically coupled to said amplifier means to receive said alternately selected signals and deliver said signals to a decoding means which decoding means has a code command output to control said vehicle's function whenever signals have been detected by both of said parallel pair of detectors and have been processed by said signal processing means, said code command signal simultaneously conditioning both said signal processing means and said signal selecting means to receive one of the alternately selected signals from said pair of detectors,
  (c) said signal processing means having an output to said signal selecting means to condition said signal selecting means to select the other signal from the alternately selected signals whenever said one signal has been processed by said signal processing means.

2. The intermittent vehicle function control system of claim 1 wherein said signal selecting means includes a first and a second gate having inputs which are electrically connected in parallel to said parallel pair of detector means, and having outputs electrically connected in common to amplifier means,
(a) a memory means electrically connected to said first and second gate and mutually controlled by said code command output and said output from said signal processing means.

3. The intermittent vehicle function control system of claim 2 wherein said amplifier means has a plurality of tuned amplifiers electrically connected in parallel and wherein the number of tuned amplifiers ($n$) equals the number of signals employed in said system to thereby provide ($n^2$) code command outputs.

4. The intermittent vehicle function control system of claim 3 wherein the vehicle is a train and the way is defined by a pair of parallel rails between which are positioned said parallel pair of signal establishing units.

5. An intermittent vehicle function control system wherein a vehicle-carried detector means responds to the presence of signal generating means positioned at distinct locations along the vehicle's way,
(a) each signal generating means having the capacity to establish at least a first and a second signal,
(b) said vehicle-carried detector means having at least a first and a second detector which responds to said first and second signal respectively,
(c) signal selecting means electrically coupled to said first and second detector means to alternately select said first signal or said second signal,
(d) tuned amplifier means electrically coupled to said signal selecting means and having a plurality of separate tuned amplifiers equal in number to the number of different signals employed in said system,
(e) signal processing means electrically coupled to tuned amplifier means to receive said alternately selected first and second signals and having a pair of outputs electrically coupled to a decoding means,
(f) said decoding means having a code command output to control said vehicle's functions whenever said first and second signals have been processed by said signal processing means while simultaneously conditioning said signal processing means and said signal selecting means to receive said first signal,
(g) said signal processing means having an output to said signal selecting means to condition said signal selecting means to select said second signal whenever said first signal has been processed by said signal processing means.

6. The intermittent vehicle function control system of claim 5 wherein said signal generating means includes a pair of parallel signal establishing units at each location along the way, and said vehicle-carried detector means is positioned on said vehicle to simultaneously pass said parallel pair of signal establishing units.

7. The intermittent vehicle function control system of claim 5 wherein said signal selecting means includes a first and a second gate having inputs which are electrically connected in parallel to said first and second detector respectively, and having outputs electrically connected in common to said tuned amplifier means,
(a) a memory means electrically coupled to said first and second gate and mutually controlled by said code command output and said output from said signal processing means.

8. The intermittent vehicle function control system of claim 7, wherein said tuned amplifier means includes a plurality of tuned amplifiers electrically connected in parallel and wherein the number of tuned amplifiers ($n$) equals the number of signals employed in said system to thereby provide ($n^2$) code command outputs.

9. The intermittent vehicle function control system of claim 8 wherein the vehicle is a train and the way is defined by a pair of parallel rails between which said parallel pair of signal establishing units are positioned.

References Cited

UNITED STATES PATENTS 3,337,727   8/1967   Freeman.
3,339,067   8/1967   Reich.

THOMAS A. ROBINSON, Primary Examiner

U.S. Cl. X.R.

246—63